Figure 1:
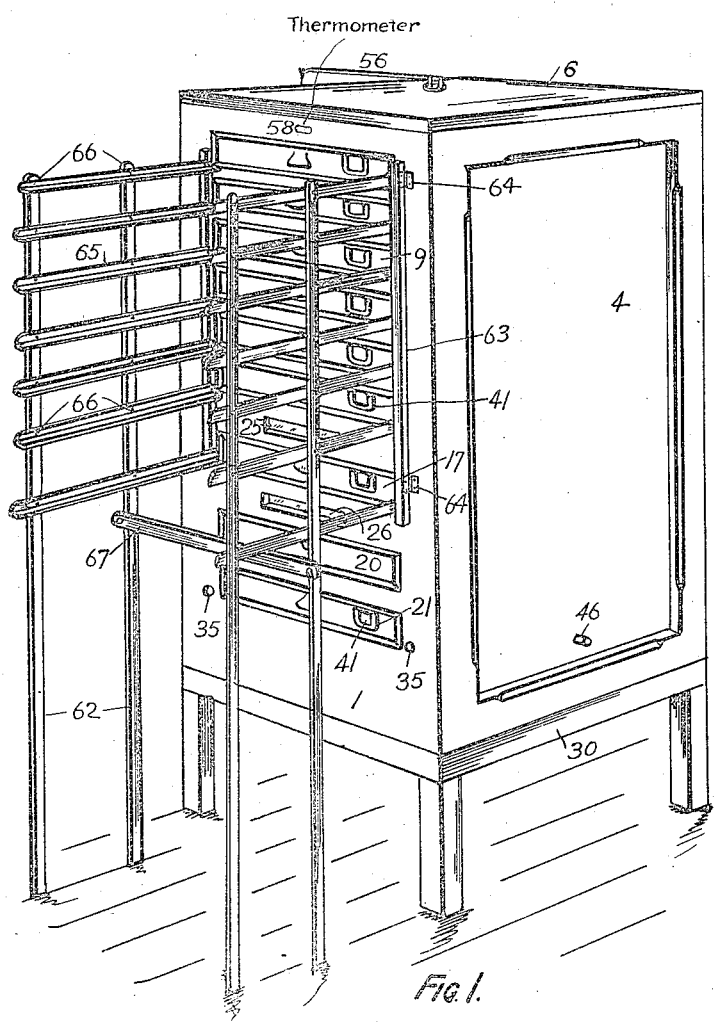

Patented Sept. 16, 1924.

1,508,851

UNITED STATES PATENT OFFICE.

FREDERICK LEONARD MOLL, OF TURRAMURRA, NEAR SYDNEY, NEW SOUTH WALES, AUSTRALIA.

METHOD OF ARTIFICIALLY INCUBATING EGGS.

Original application filed October 8, 1919, Serial No. 329,343. Divided and this application filed September 15, 1920. Serial No. 410,494.

*To all whom it may concern:*

Be it known that FREDERICK LEONARD MOLL, subject of the King of Great Britain and Ireland, and residing at Eastern Road, Turramurra, near Sydney, New South Wales, Australia, has invented new and useful Improved Methods of Artificially Incubating Eggs, of which the following is a specification.

The present invention relates to an improved method of artificially incubating eggs, and the present case is a division of my application Serial No. 329,343, filed October 8, 1919, which has become Patent 1,438,455, issued December 12, 1922.

By my method of artificial incubation of eggs the eggs are exposed to heated air in trays or drawers which are arranged in one or more vertical rows in an incubating chamber to which atmospheric air is supplied and which has associated with it a source of artificial heat and is provided with openings for allowing waste gases and vapors to be discharged therefrom. The hot air is transmitted to the eggs in the several drawers or trays at differing temperatures depending on the position of such trays or drawers in the rows of same contained in the incubating chamber, and the artificial heat is so distributed in the incubating chamber that the uppermost drawer or tray of a row of such has supplied to it the greatest quantity of artificial heat whilst the lower drawers in descending order receive a lesser quantity of artificial heat.

My method of artificially incubating eggs permits of the treatment of the eggs in each tray or drawer in such manner that they will be subjected to varying degrees of artificial heat in different zones of the incubating chamber, during the different periods or stages of incubation; and it allows of supplies of new eggs to be treated in the incubating chamber, with other eggs which have already been partially incubated therein, so that the process of incubation of the whole of the eggs is rendered continuous, and hatching is secured in a more economical and expeditious manner.

In accordance with my method of artificially incubating eggs a supply of eggs is first placed in the uppermost tray or drawer of a vertical row of such arranged in an incubating chamber to which atmospheric air is supplied and from which waste gases and vapors may be discharged, and they are subjected therein to heated air for a period of time depending on the number of eggs which it is intended to submit to incubation in separate trays or drawers over a definite period of time. When the first setting of eggs has been heated up to a certain stage of incubation the tray or drawer containing them is removed from the incubating chamber and such tray or drawer with the eggs therein is replaced in the chamber at the level occupied by the tray or drawer next lower to it in the vertical row when that level has become vacant by the removal therefrom of the tray or drawer which was occupied by it. A second drawer or tray containing a fresh supply of eggs, which have preferably been preheated, is inserted in the chamber in the position previously occupied by the uppermost tray or drawer; and these eggs, together with the first setting of eggs, are submitted to the heat of the chamber, until the latter eggs have attained a second period of incubation. A series of trays or drawers containing eggs and forming a vertical row thereof are positioned and re-positioned in the chamber as beforementioned, so that during each period of incubation of the first setting of eggs the tray or drawer containing those eggs and other trays or drawers containing eggs which have been incubated for a lesser period will be removed at definite intervals of time from a higher to a lower level in the chamber until the whole of the eggs have become hatched.

Figure 2:
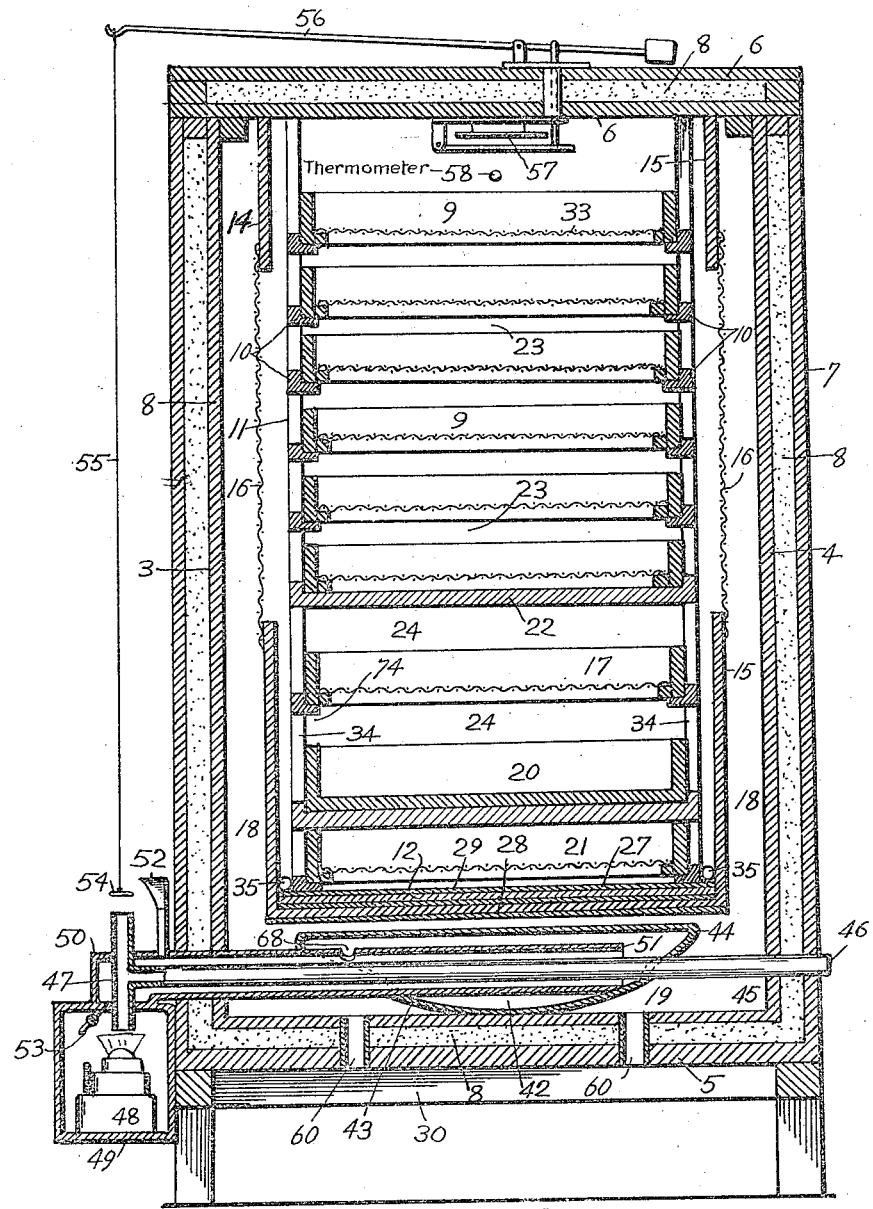
Figure 3:
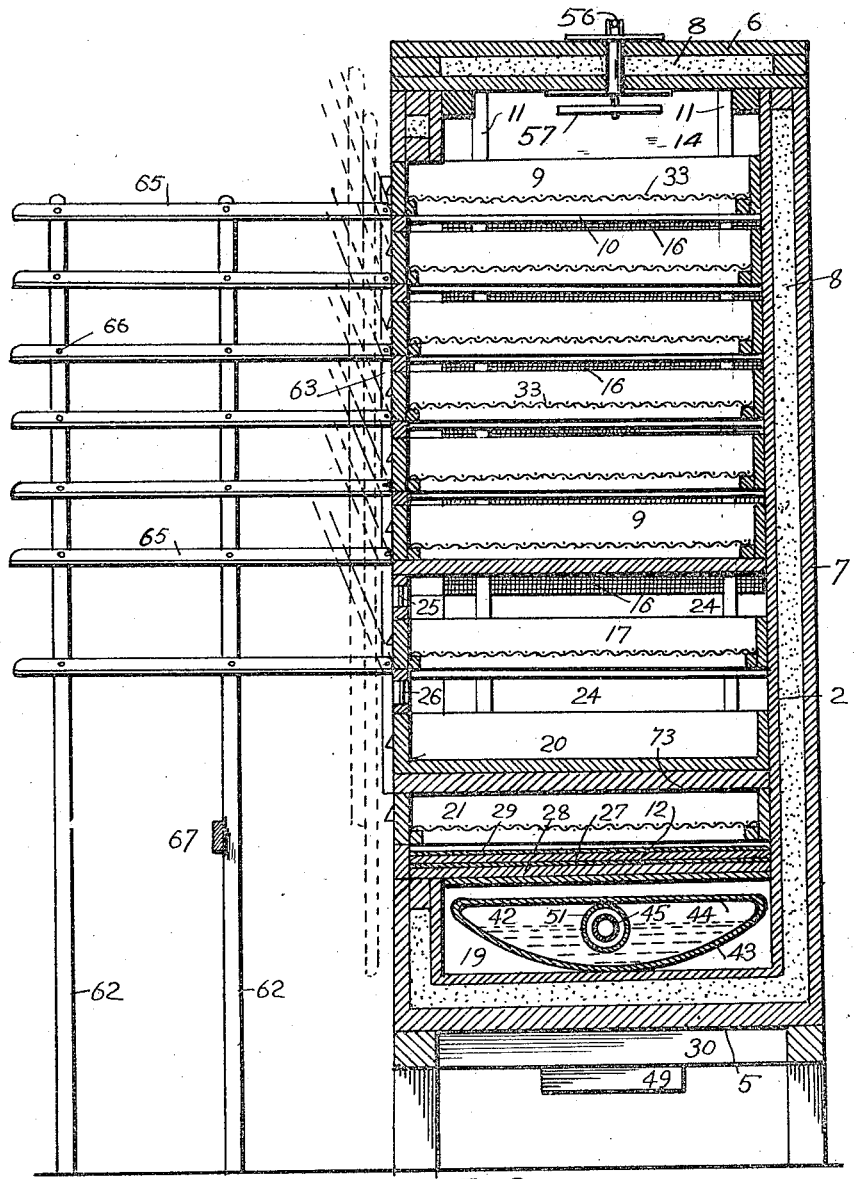

In the accompanying drawings is shown an incubating apparatus suitable for use in carrying out the incubation of eggs by my method and in which Fig. 1 is a perspective view of an incubating apparatus provided with a tier of drawers and a folding frame affixed to its front portion to hold the drawers when they are pulled outwardly from the chamber; Fig. 2 is a vertical sectional elevation of the apparatus shown in Fig. 1; and Fig. 3 is a transverse sectional elevation thereof.

The incubating chamber comprises respectively front, rear, and side walls, 1, 2, 3, and 4, bottom 5, and a removable cover 6. It may be supported on the frame 30. The walls 1—4 are enclosed by an outer casing 7 and in the cavity between said walls and casing is placed insulating material 8 such as wood charcoal, or slag wool or any other suitable insulating material. Similarly the cover 6 and the bottom 5 are insulated by insulating material 8. A series of openings are provided in the front wall 1 through which the tier of drawers 9 are inserted. These drawers excepting the lower one thereof are supported on crossbars 10 which extend from the front wall of the chamber to the rear wall 2 thereof and have their ends affixed to the upright posts 11 which reach from the top of the chamber to the floor 12 of a compartment 13 which is constructed internally of the chamber. The compartment 13 has side walls 14 and 15, the lower and upper parts of which are solid whilst their intermediate portions are formed with a porous diaphragm 16 consisting of a fibrous fabric such as hessian or like suitable material which is capable of permitting heated atmospheric air to pass therethrough. In the drawings the lower portions of the walls 14 and 15 are shown extending upwardly from the floor 12 to a point a small distance above the top of the hatching drawer 17 and the upper portions of the walls are shown extending downwardly from the top of the chamber to a point about parallel with the top of the second drawer of the tier of drawers 9 and the porous diaphragm 16 is stretched between both portions with its ends fastened to them respectively. Such diaphragm is disposed at each side of the tier of drawers 9 to permit of heated atmospheric air being supplied through it to each of the drawers of the tier 9, and the upper portion of the walls 14 and 15 must be so arranged that the uppermost drawer of the tier of drawers will receive the greatest quantity of artificial heat. The walls 14 and 15 may be replaced by a rectangular frame constructed of battens secured to each other and to which the ends of the porous diaphragm 16 are affixed. Such frame may be detachably fastened within the incubating chamber in the position occupied by the walls 14 and 15. The removable frame is, however, constructed in a manner similar to the walls 14 and 15 to receive the porous diaphragm 16.

Intermediate the walls 3 and 4 of the incubating chamber and the walls 14 and 15 of the compartment 13 are the heat radiating flues 18 which are in communication at their lower ends with the cavity 19 formed in the lower portion of the incubating chamber between its bottom 5 and the floor 12 of the compartment 13. As the floor 12 forms the support for the egg preheating drawer 21 which is positioned immediately above it and as the heat from the cavity 19 is to be deflected into the radiating flues 18, the floor is provided on its bottom with a sheet of asbestos 28 or other suitable heat insulating material and its top is furnished with a packing of heat non-conducting material 27 such as slag-wool or the like over which is laid a sheet of asbestos 29 or like heat insulator.

In addition to having the tier of drawers 9 beforementioned, the incubating chamber is fitted with a hatching drawer 17 which is situated below the lowermost drawer of the tier, and it may also be equipped with a nursery drawer 20 below the hatching drawer, and also with an egg preheating drawer 21 which forms the lowermost drawer of the series of drawers described. The preheating drawer 21 rests on the floor 12 of the compartment 13 and the nursery drawer 20 is carried on the floor 73, whilst the hatching drawer 17 is supported on crossbars which are similar to the crossbars 10 and are similarly affixed to the post 11. The floor 73 may, however, be dispensed with and the hatching drawer may be mounted on a pair of crossbars similar to the crossbars 10. Dividing the tier of drawers 9 from the hatching drawer 17 is the floor 22 upon which the lower drawer of the tier of drawers 9 is supported. Each of the drawers in each tier of drawers is spaced sufficiently apart to allow of the proper degree of heat to be transmitted to them. It the drawings the tier of drawers is shown with equal spaces 23 between them and the hatching drawer 17 and nursery drawer 20 with a greater space 24 between them which latter space is about equal to a similar space 24 between the floor 22 and the hatching drawer 17. The spaces between the separate tiers of drawers may, however, be arranged so that the space between the fourth and fifth and between the fifth and the sixth drawers of each tier 9 will be greater than the spaces between the other drawers of the tier of such. In the front wall 1 of the incubating chamber between the lowest drawer of the tier of drawers 9 and the hatching drawer 17 and between the latter and the nursery drawer 20 sight windows 25 and 26 are fitted. It will be understood that the preheating drawer 21 may be dispensed with, as any eggs which are to be preheated before the tray containing them is set in the position occupied by the uppermost drawer of the tier 9 in the incubating chamber, may be preheated in any suitable device independent of the incubating chamber, or they may be preheated in any vacant drawer of the tier 9 if the whole of the drawers are not occupied by eggs undergoing incubation at the one time.

Each of the drawers beforementioned, has solid sides and ends respectively with meshed bottoms 33 constructed of woven wire or wire netting of narrow gauge or like perforated material. In the drawing the nursery drawer is shown with a solid bottom. It may, however, be fitted with a solid bottom or with a perforated bottom as described. All the drawers are open at the top and heat can therefore be transmitted from them to each other. As there are spaces 23 between the bottom and top respectively of each pair of drawers of the tier of drawers 9 heated air may be supplied to each of them from the radiating flues 18. The spaces 23 between each pair of drawers in the tier of drawers 9 are in communication with the compartment 13 and heated air is consequently free to pass from the flues 18 through the porous diaphragm 16 into the compartment 13 and thence through the spaces 23 into the individual drawers of the tier of drawers 9. To permit waste gases and vapors to be discharged from the incubating chamber the lower portions of the walls 14 and 15 are extended upwardly from the floor 12 to a position a small distance above the top of the hatching drawer 17 and pockets 34 are thus formed between the lower portions of the walls 14 and 15 and the sides of the hatching drawer 17, and the nursery drawer 20. The spaces 74 between these drawers are open to the pockets 34 and gases and vapors arising from the eggs in the hatching drawer and the chickens in the nursery drawer are free to issue into such pockets and to be discharged to atmosphere from the incubating chamber through outlet holes 35 which are furnished in the rear and front walls of the chamber and communicate with the pockets 34 at the bottom thereof. Similarly, any vapors or gases arising from the tier of drawers 9 are discharged to atmosphere through the openings 35 as the pockets form the lower part of the compartment 13 and are open at their upper ends to said compartment.

The means for transmitting heat to the radiating flues 18 illustrated comprise a boiler 42 which rests on the bottom 5 of the incubating chamber. The boiler is made of such dimensions to permit it to occupy the greater part of the cavity 19 which extends from the front to the rear walls 1 and 2 of the chamber and the full width thereof and its bottom 43 is preferably curved, while its top 44 may either be flat as shown or it may also be curved. Extending through the boiler is the pipe 45 which has one end 46 open to atmosphere and its other end open to the heating flue 47 above a lamp 48 in the lamp box 49, the flue being prolonged through the lamp box to a chamber 50 which forms the outer end of the sleeve 51 which surrounds the pipe 45 and projects into the boiler 42. Connected with the sleeve 51 is the funnel 52 through which water may be fed into the sleeve 51 and from thence into the boiler 42. To permit water to be drawn off from the chamber a tap 53 is fitted to it. Small openings 68 are made in the sleeve 51 to enable circulation of water to occur through the tube 51 and the boiler 42 when the water becomes heated. Above the heating flue 47 is a damper 54 which is carried on the lower end of a flexible connection 55, the upper end of which is mounted on the end of a lever 56 associated with any suitable form of thermostatic device 57 located within the incubating chamber and adapted to be operated by the heat of the chamber to raise or lower the damper 54 for the purpose of controlling the supply of artificial heat to the pipe 45 and the boiler 42. A thermometer 58 is provided at the top of the incubating chamber above the uppermost drawer therein. The thermostatic device 57 may be set to be operable at a definite temperature of the incubating chamber, say 103° F.; the regulation of the device may be adjusted after the temperature of the upper portion of the chamber has been determined by the reading of the thermometer 58.

Atmospheric air is free to pass into the cavity 19 in the incubating chamber through the openings 60 in the bottom 5 thereof and it is brought into contact with the heated surfaces of the boiler 42 and its temperature is thereby raised. It is then conducted into the radiating flues 18 at the sides of the incubating chamber and travels upwardly therein and percolates through the interstices of the hessian or other fibrous diaphragm 16 into the drawers 9 through the spaces 23 between them.

I prefer to fit to the front of the incubating chamber a rack frame which is capable of supporting the drawers 9 when they are withdrawn from the chamber to enable the eggs carried by them to be cooled and aired. In Figs. 1 and 3 is shown a frame which is suitable for the purpose; it is provided with supporting legs 62 and racks 65 each of which is pivoted to the legs and to the battens 63 which are hinged at 64 to the front wall 1 of the chamber. The racks 65 are L-shaped and two of them are provided for each drawer so that the latter may rest on one portion of them whilst their other portion is pivoted as shown at 66 to the legs 62. The rack frame is positioned in front of the incubating chamber about the drawers 9 and it may be collapsed and folded against the front wall 1 of the chamber. A cross rail 67, which is pivoted at one end to one of the legs 62 and at its other end detachably secured to one of the opposite legs 62 of the frame, serves to strengthen the frame and to brace the legs to each other. When the frame is to be collapsed the cross rail 67 may be folded against the leg 62 to which it is pivoted.

In operating the apparatus described in the carrying out of my method for the incubation of eggs a supply of eggs is placed in the uppermost drawer of the tier of drawers 9 and when such eggs have been partially incubated the drawer carrying them is removed from the chamber; such drawer is then replaced in the chamber at the level or zone occupied by the next lower drawer in the tier of drawers 9 after the latter drawer has been removed from the level or zone occupied by it and simultaneously another drawer containing a fresh supply of eggs which have preferably been preheated to a temperature between 85°–100° F. either in the drawer 21 or in one of the other vacant drawers located in the chamber or independently thereof is positioned in the chamber at the level or zone which was occupied by the drawer carrying the eggs which were first set in the chamber. If the chamber is provided with a vertical row of drawers consisting of seven separate drawers and it is intended to utilize each such drawers for the setting of separate supplies of say hen's eggs the drawer carrying the first setting of eggs is removed from the chamber and replaced in the next lower zone or level of it occupied by the drawer next lower to it as before described at the end of each period of three days so that at the commencement of the fifteenth day it will occupy the zone or level which was occupied by the lowest drawer of the tier of drawers 9, from whence it is removed at the end of the eighteenth day and replaced in the chamber in the zone or level next lower to it after that level or zone has been rendered vacant by withdrawing the drawer which was occupied by it. The latter zone or level is the "hatching" zone of the chamber and the first setting of eggs contained in drawers positioned in same are allowed to remain therein for a further period of three days so that the eggs may become hatched. After hatching the chickens may pass to the nursery drawer 20.

Whilst the drawers are located in the separate zones or levels of the incubating chamber the eggs which they carry are subjected to heated air which is radiated through the flues 18 in the chamber and transmitted therefrom to the eggs through the porous diaphragm 16.

The period of time during which the eggs which are set in the chamber are allowed to remain in any of its zones or levels will depend on the number of trays containing eggs which are to be submitted to different stages of incubation simultaneously, and also upon the length of time required for the incubation of eggs of varying nature.

What I claim as my invention and desire to secure by Letters Patent is:—

1. An improved method of artificially incubating eggs in an incubating chamber to which artificial heat and atmospheric air are supplied, from which waste gases and vapors are discharged, and wherein heated atmospheric air is distributed by natural draft to separate fixed primary and secondary zones so that the primary zone will receive air of greater temperature than the other zones which receive air of lower temperature in descending order but not by carrying the units of heat from eggs in a more advanced stage of incubation to those in a less advanced stage, said method consisting in subjecting a batch of eggs to heated atmospheric air in the primary zone of said chamber, wherein said eggs are partly incubated; removing said eggs from said chamber and replacing them in a secondary zone in said chamber and simultaneously adding to said primary zone another batch of eggs; subjecting said latter eggs to heated atmospheric air until they are partly incubated whilst said eggs in the secondary zone are undergoing further incubation with heated atmospheric air of lower temperature; removing said eggs from said chamber and replacing them in other zones in said chamber to those previously occupied by them and simultaneously adding to each zone rendered vacant by such removal a batch of eggs, and continuing said removal and replacement and addition of other batches of eggs.

2. In the method of artificially incubating eggs as set forth in claim 1 hereof, preheating the eggs by subjecting them to heated atmospheric air before they are placed in the primary zone of the incubating chamber.

3. A method of incubation consisting in inserting a batch of eggs into the upper portion of a chamber, circulating heated air through said chamber to maintain the chamber in a gradually decreasing heated condition from its upper to its lower end, permitting said batch of eggs to remain in said chamber for a certain period of time, then removing said batch of eggs from the chamber and reinserting the same in said chamber in a position where the condition of the temperature is lower than that in the zone first occupied in the batch of eggs, simultaneously inserting a second batch of eggs in the zone first occupied by the first mentioned batch of eggs, permitting both batches of eggs to remain in said chamber for a certain period of time, then removing both batches of eggs from the chamber and inserting them in said chamber at zones of lower temperature than the first mentioned zone and simultaneously inserting a third batch of eggs in the first mentioned zone, and continuing the withdrawal of each of said batches of eggs from said chamber and the replacement of the same from said chamber in zones of successively decreasing temperature until each batch of eggs is hatched.

In testimony whereof I have affixed my signature.

FREDERICK LEONARD MOLL.